United States Patent [19]
Tierno

[11] 3,765,704
[45] Oct. 16, 1973

[54] TOW BAR
[76] Inventor: Anthony Tierno, Philadelphia, Pa.
[22] Filed: Aug. 24, 1972
[21] Appl. No.: 283,355

[52] U.S. Cl.......... 280/482, 280/491 E, 280/491 R
[51] Int. Cl.............................................. B60d 1/00
[58] Field of Search.............. 280/482, 491 D, 478, 280/495, 491 E, 491 A

[56] References Cited
UNITED STATES PATENTS
| | | | |
|---|---|---|---|
| 1,435,063 | 11/1922 | Holmes | 280/482 |
| 2,658,770 | 11/1953 | Koenig | 280/491 D X |
| 3,281,162 | 10/1966 | Carson | 280/478 B |
| 3,492,022 | 1/1970 | Hansen | 280/478 R |
| 3,572,765 | 3/1971 | Tieben | 280/491 D |

FOREIGN PATENTS OR APPLICATIONS
436,748   11/1926   Germany ........................... 280/482

Primary Examiner—Leo Friaglia
Attorney—Zachary T. Wobensmith

[57] ABSTRACT

A tow bar for vehicles is provided which has a main frame portion of generally A-shape with a detachable coupling at the apex for attachment to a ball on the towing vehicle, the frame having fixed rearwardly extending side arms with detachable side arms for attachment directly or indirectly to the vehicle to be towed, the side bars being selectively attachable at different locations to provide a plurality of widths to accommodate different towed vehicles.

5 Claims, 7 Drawing Figures

Patented Oct. 16, 1973 3,765,704

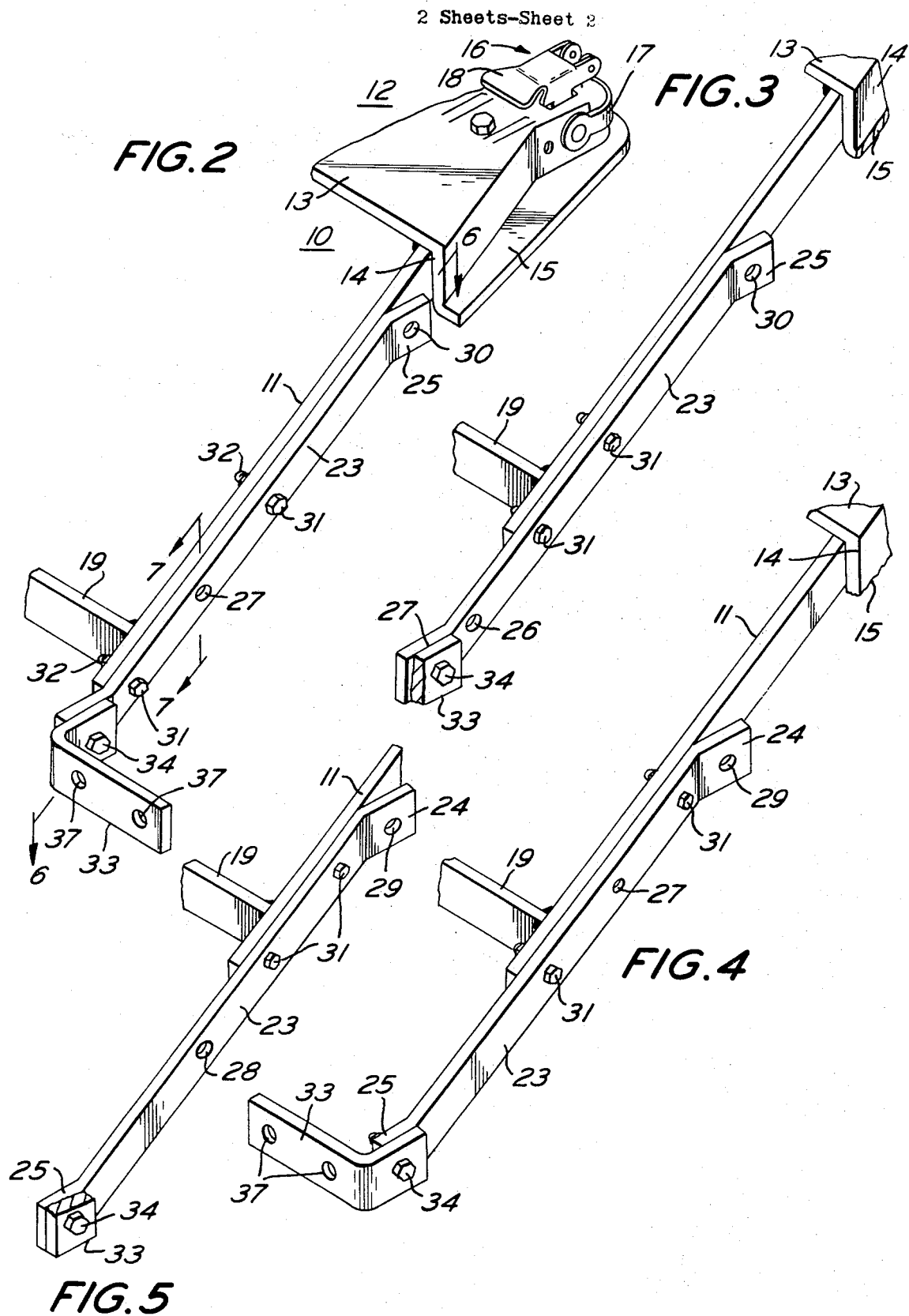

TOW BAR

BACKGROUND OF THE INVENTION

1. Field of the Invention

This invention relates to draft devices for towing vehicles.

2. Description of the Prior Art

Various devices have heretofore been proposed for towing a vehicle. Examples are shown in U.S. Pats. No. 1,435,063, to Holmes, No. 1,436,595 to McKay, No. 3,281,162 to Carson, No. 3,492,022 to Hanser and No. 3,572,765 to Teiben.

These devices have various shortcomings including lack of strength, lack reliability in use or lack adjustability to accommodate various vehicles to be towed.

SUMMARY OF THE INVENTION

In accordance with the invention, a tow bar is provided having a main frame of generally A-shape with a detachable coupling for attachment to a ball on a towing vehicle, the frame having diverging rearwardly extending side arms with rearwardly extending detachable side extension arms for attachment directly or indirectly to the vehicle to be towed, the side arms being selectively attachable at different locations and with different orientation to provide a plurality of widths at the rear ends of the side extension arms to accommodate different towed vehicles.

BRIEF DESCRIPTION OF THE DRAWINGS

The nature and characteristic features of the invention will be more readily understood from the following description taken in conjunction with the accompanying drawings forming part thereof, in which:

FIG. 2 is a fragmentary perspective view, as seen from one side, showing the tow bar of FIG. 1;

FIG. 3 is a view similar to FIG. 2 showing another position of adjustment;

FIG. 4 is a view similar to FIGS. 2 and 3 showing another position of adjustment;

FIG. 5 is a view similar to FIGS. 2, 3 and 4 showing another position of adjustment;

Figure 1:
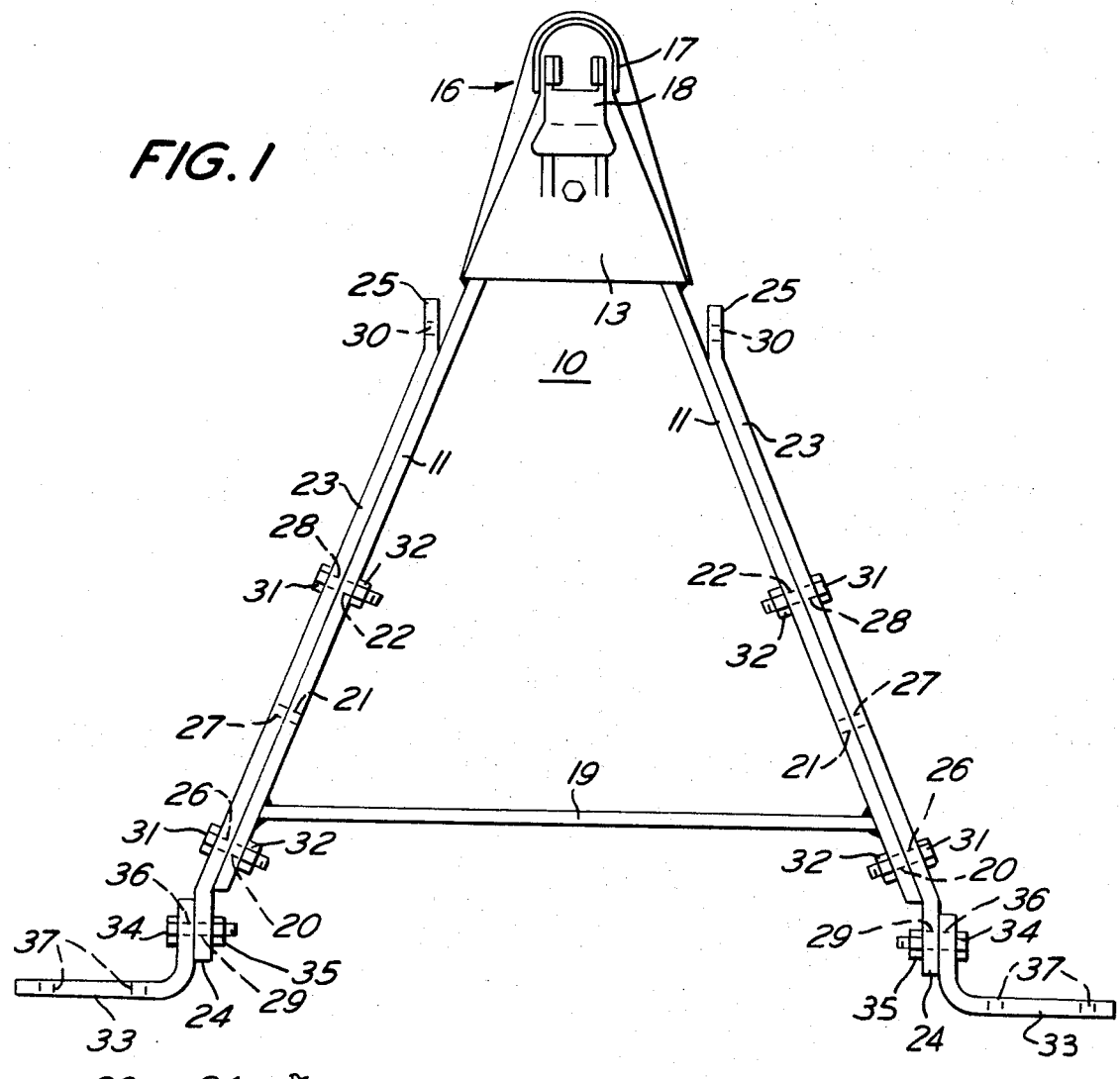
FIG. 1 is a top plan view of the tow bar of the invention in one position of adjustment.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the tow bar in accordance with the invention includes a main body 10 which includes diverging rearwardly extending side arms 11, preferably rectangular in cross section, held at their front ends by a frame 12, with a top frame plate 13 and unitary side frame plates 14 with lower flaring edges 15. The side arms 11 are preferably secured to the frame 12 by welding.

The top frame plate 13 has a coupling 16 carried thereby for attachment to a ball (not shown) on a towing vehicle. While any suitable coupling 16 can be employed, a coupling which has been found satisfactory is shown in the U. S. Pat. to Kirk, et al., No. 3,163,445. The coupling 16 is shown as including a pivoted yoke 17 slidable forwardly and rearwardly for ball coupling and uncoupling, and a pivoted latch 18 releasably retaining the yoke 17 in coupled relation.

The main body 10 preferably includes a transverse spacer and brace bar 19 which is welded at its ends to the side arms 11 near their rear ends.

The side arms 11 are each provided with a plurality of holes 20, 21 and 22, preferably equally spaced, one of which at 20, is preferably rearwardly spaced with reference to the brace bar 19 and the other two of which, at 21 and 22, are preferably rearwardly of the centers of the side arms 11, considered from end to end.

A pair of detachable side arms 23 are provided, preferably rectangular in cross section to be clamped on the outer faces of the arms 11. Each of the arms 23 has angularly inclined end portions 24 and 25, extending out of the longitudinal plane of the arm 23 in opposite directions. The angle of inclination of the end portions 24 and 25 is determined by the divergence of the arms 11 and is such that when the arms 23 are clamped on the arms 11, the rearwardly disposed end portions 24 and 25 will be parallel.

Each of the arms 23 has a plurality of holes 26, 27 and 28, preferably equally spaced and at the same spacing as the holes 20, 21 and 22. The holes 26, 27 and 28 are preferably closer to the end portion 24 than to the end portion 25.

The end portions 24 each has a hole 29 and the end portions 25 each has a hole 30 for the purposes to be explained.

The detachable side arms 23 can be fastened to the fixed side arms 11 to obtain a plurality of end spacings for the ends 24 or 25 by bolts 31 and nuts 32 disposed through the holes 20, 21, and 22 and the holes 26, 27 and 28 and dependent upon the orientation of the arms 23 with respect to the arms 11.

Figure 6:
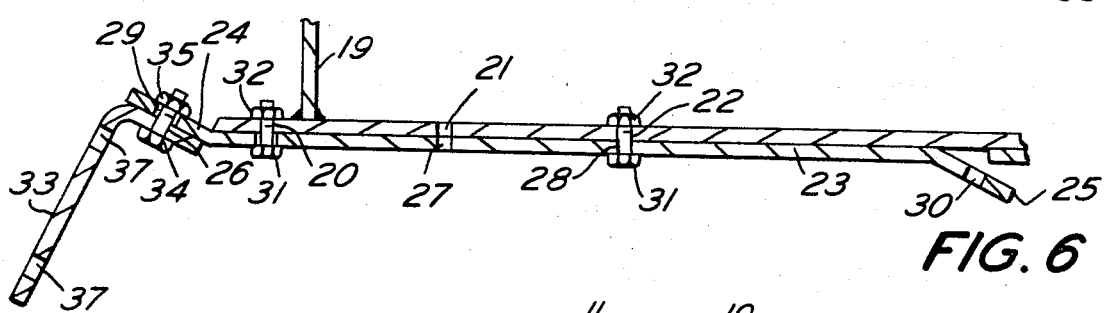
FIG. 6 is a horizontal sectional view, taken approximately on the line 6—6 of FIG. 2.
Figure 7:
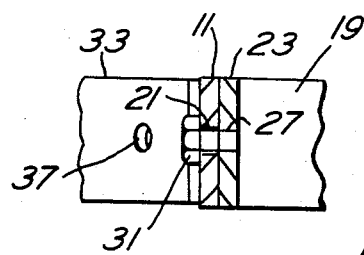
FIG. 7 is a vertical sectional view, taken approximately on the line 7—7 of FIG. 2.

One selected positioning is shown in FIGS. 1, 2 and 6 which in a particular embodiment of the invention gives a spacing of the end portions 24 of thirty inches with the ends 24 rearwardly and with bolts 31 extending respectively through holes 26 and 20 and holes 28 and 22.

Another selected positioning is shown in FIG. 3 in which the side arms 23 are moved rearwardly along the arms 11 to move the ends 24 rearwardly. With bolts 31 disposed respectively through holes 28 and 21 and holes 27 and 20 in the embodiment just referred to a spacing of the ends 24 of thirty four inches can be obtained.

Another selected positioning is shown in FIG. 4 in which the arms 23 are turned end for end from the positions previously described and also reversed so that the rearward ends 25 are parallel. With bolts 31 respectively in the holes 26 and 22 and the holes 28 and 20 in the embodiment previously referred to, a spacing of the ends 25 of thirty seven inches can be obtained.

Another selected positioning is shown in FIG. 5 in which the arms 23 are oriented as shown in FIG. 4 but with the bolts 31 respectively in the holes 26 and 21 and the holes 27 and 20 which in the embodiment previously referred to will give a spacing of the ends 25 of forty inches.

The ends 24 through the bolt holes 29 can in some instances be clamped directly to the frame of the vehicle to be towed.

The ends 24 and 25 through bolt holes 29 and 30 can each have an angle bracket 33 secured thereto by bolts 34 and nuts 35 extending through bolt holes 36, and disposed outwardly as illustrated in FIGS. 1 and 2 or inwardly as illustrated in FIG. 4. The brackets 33 are shown as having bolt holes 37 for securing the same to the bumper or other part of the vehicle to be towed.

The tow bar as heretofore described in particularly useful for modified stock and other racing cars which are towed to the place of competition but is not limited to such use.

I claim:

1. A tow bar having
   a main body with a forwardly disposed frame and rigid rearwardly disposed diverging arms secured to and extending from said frame,
   said frame having a coupling carried thereby,
   a pair of detachable arms having ends extending angularly therefrom for parallel disposition rearwardly of said rigid arms, and
   means for connecting said detachable arms to said rigid arms,
   said last mentioned means including a plurality of spaced bolt holes in said rigid arms and a plurality of equally spaced bolt holes in said detachable arms,
   the bolt holes in said detachable arms being closer to one of said ends whereby upon selected end to end arrangement and orientation of said detachable arms said detachable arms can be secured at a plurality of locations with the rearmost ends at predetermined selected spacings, and
   bolts extending through selected holes retaining said detachable arms in engagement with said rigid arms.

2. A tow bar as defined in claim 1 in which
   said ends have securing bolt holes therethrough.

3. A tow bar as defined in claim 2 in which
   clamping brackets are secured to said ends by bolts extending through said clamping brackets and said ends.

4. A tow bar as defined in claim 1 in which
   said frame has a transverse brace bar between the rear ends of said rigid legs.

5. A tow bar as defined in claim 4 in which
   one of the holes in each of the rigid arms being rearwardly disposed with respect to said brace bar.

* * * * *